Sept. 26, 1972    H. ISELI    3,694,288
METHOD FOR THE FABRICATION OF NAIL PLATES AND
APPARATUS FOR THE PERFORMANCE OF THE
AFORESAID METHOD
Filed March 29, 1971    10 Sheets-Sheet 1

INVENTOR
HANS ISELI
BY   WERNER W. KLEEMAN
ATTORNEY

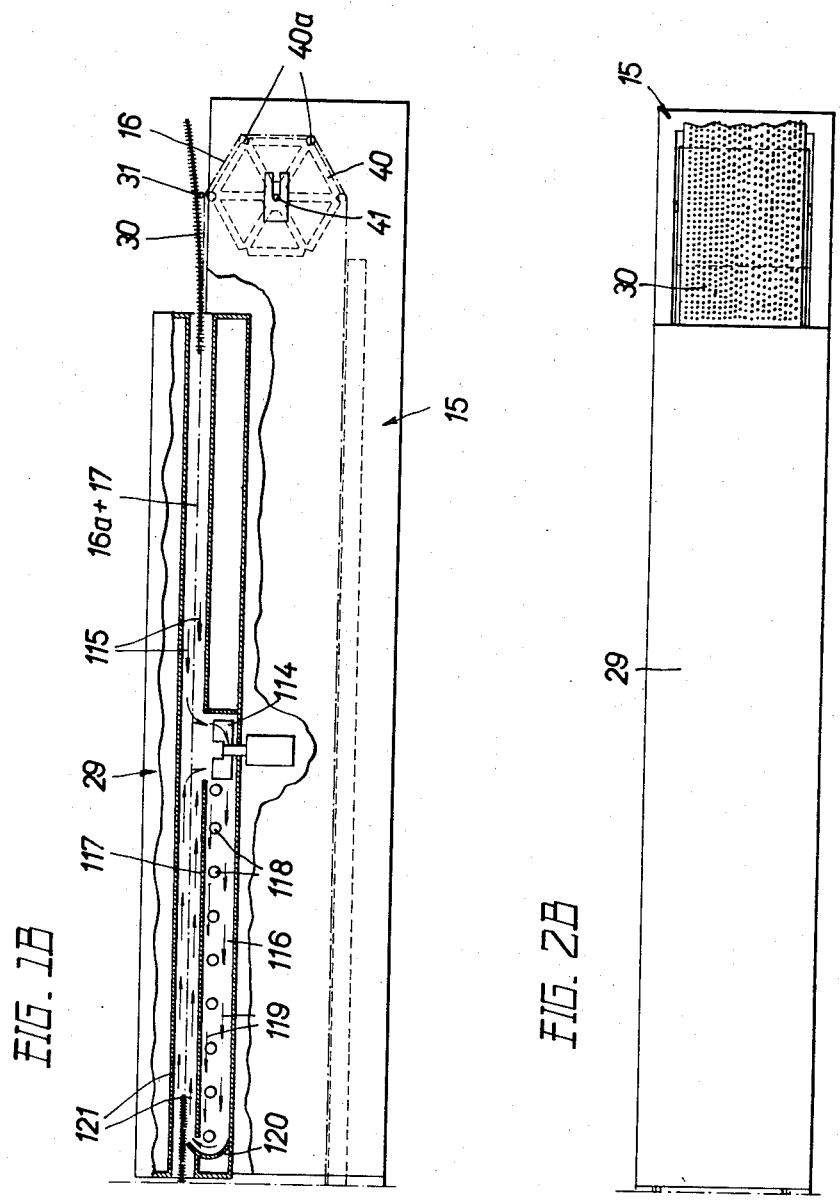

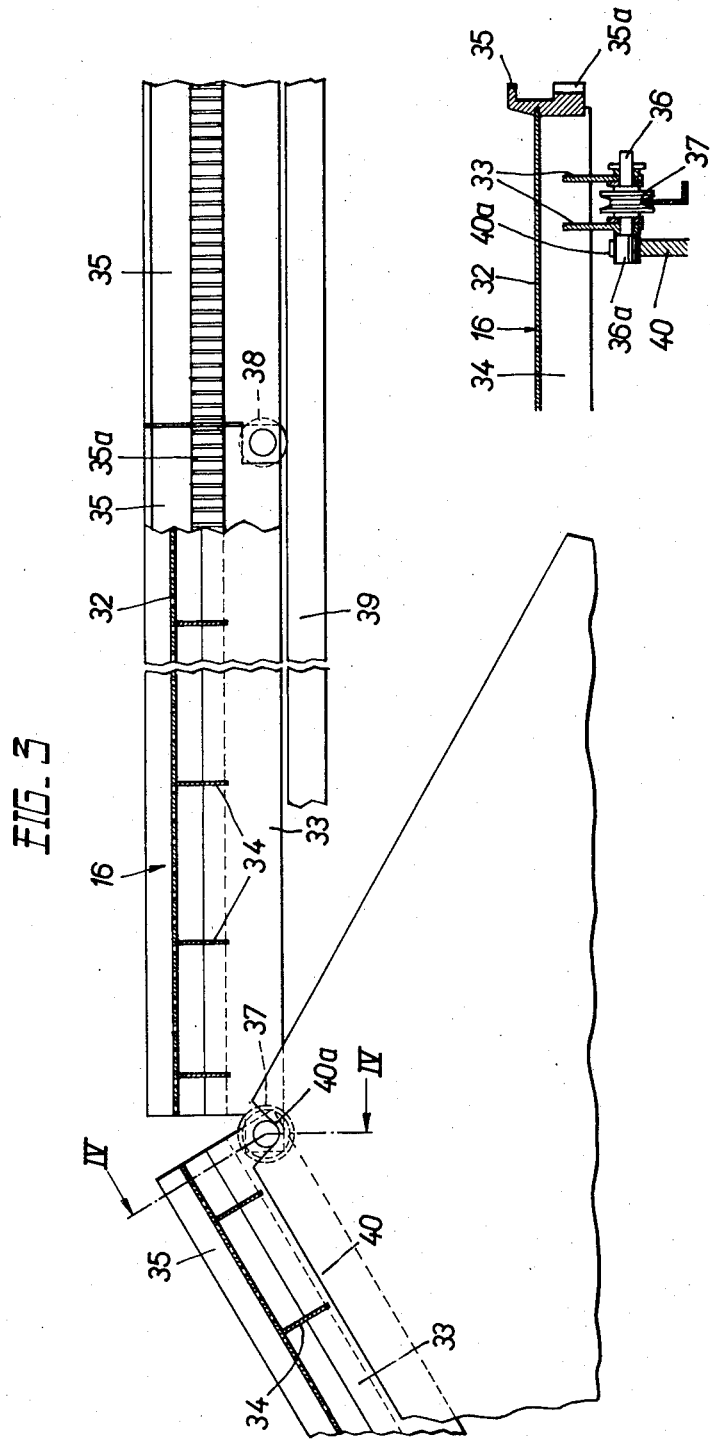

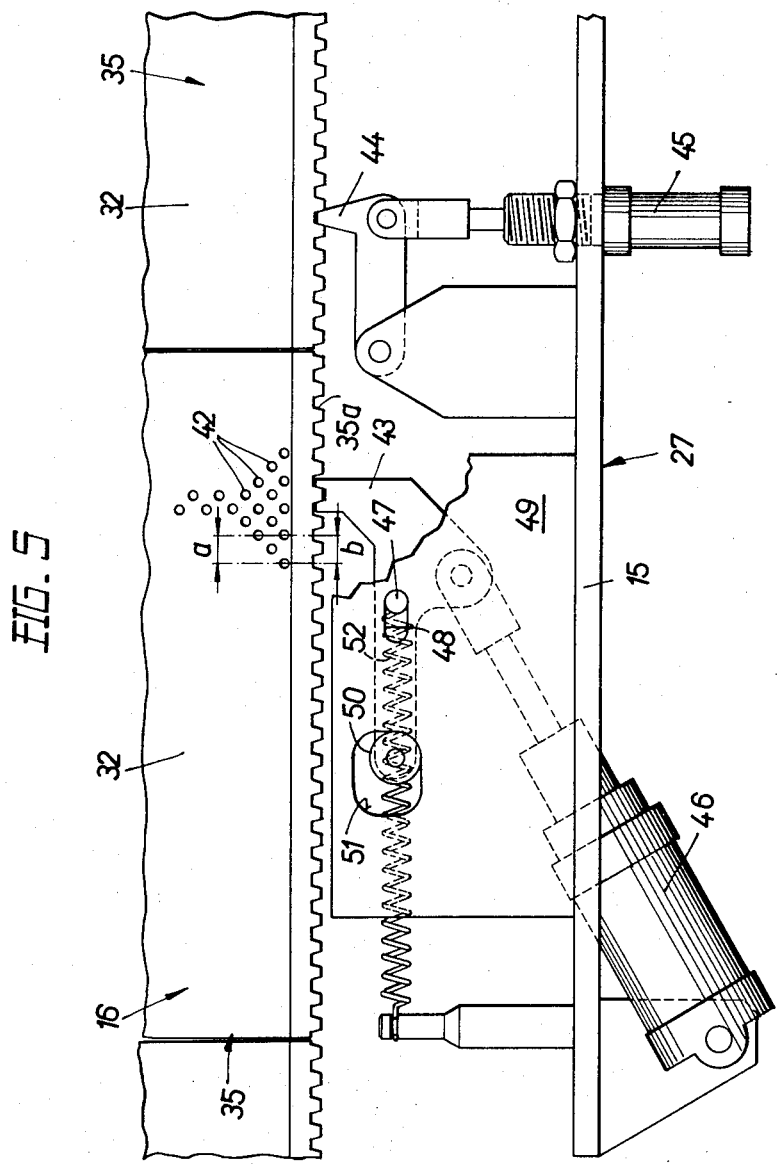

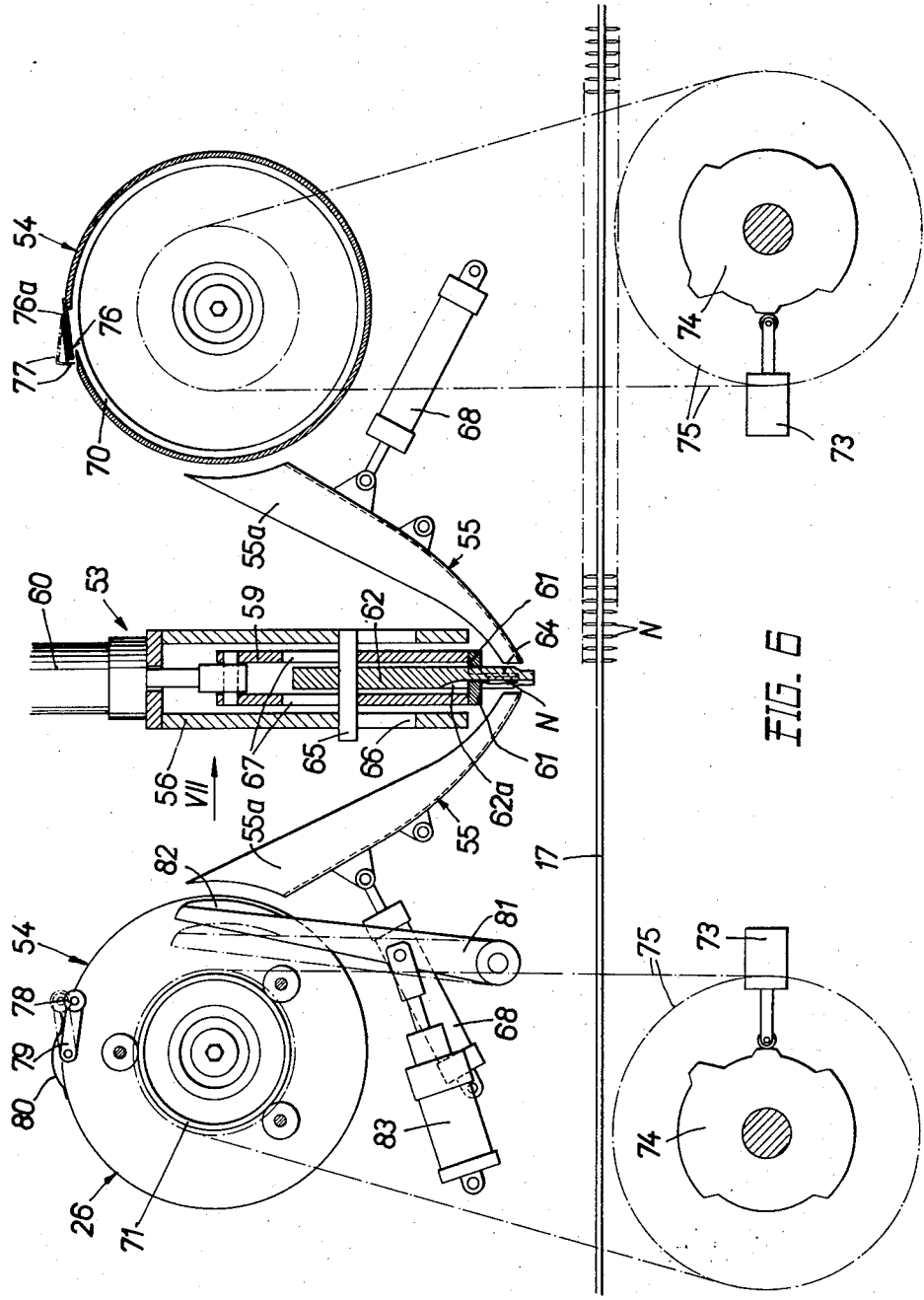

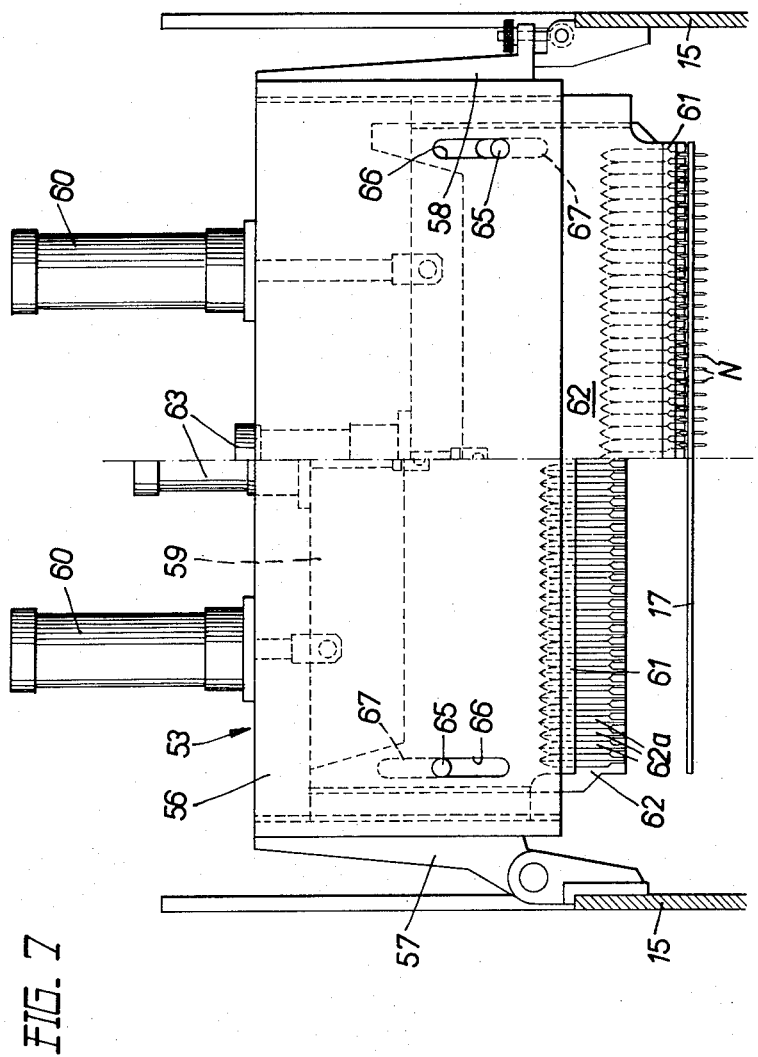

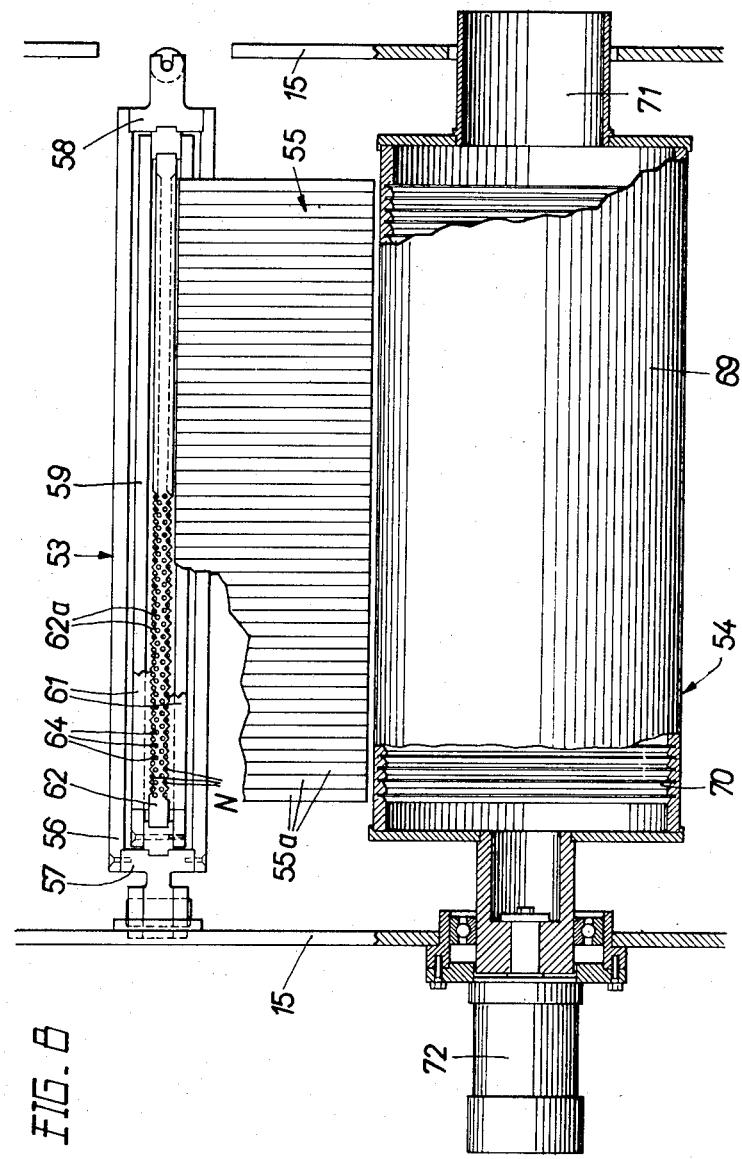

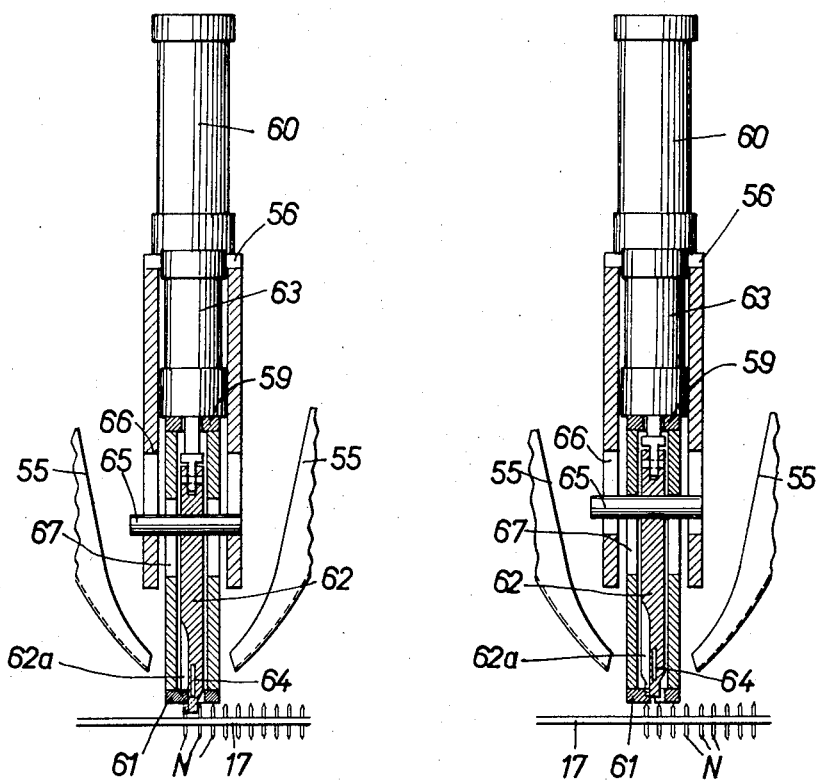

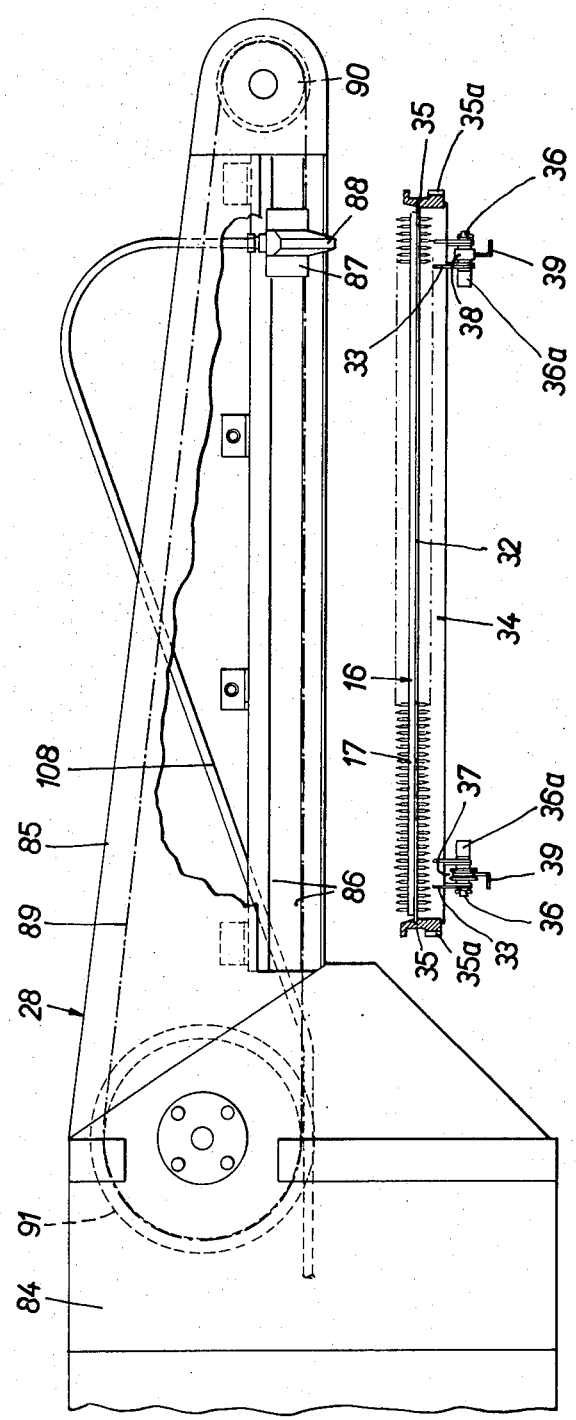

Sept. 26, 1972 H. ISELI 3,694,288
METHOD FOR THE FABRICATION OF NAIL PLATES AND
APPARATUS FOR THE PERFORMANCE OF THE
AFORESAID METHOD
Filed March 29, 1971 10 Sheets-Sheet 10
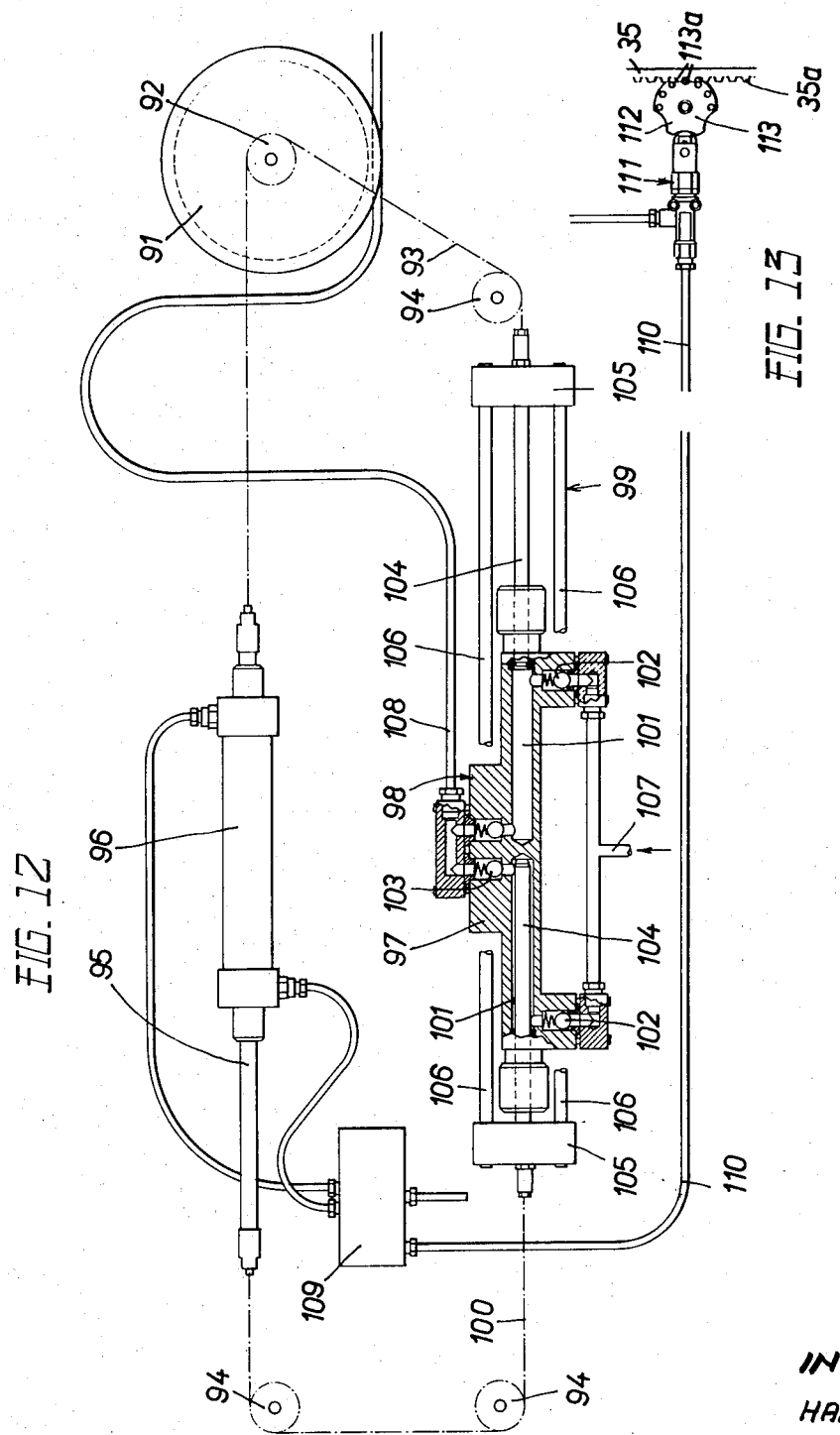
INVENTOR
HANS ISELI
BY WERNER W. KLEEMAN
ATTORNEY

United States Patent Office 3,694,288
Patented Sept. 26, 1972

3,694,288
METHOD FOR THE FABRICATION OF NAIL PLATES AND APPARATUS FOR THE PERFORMANCE OF THE AFORESAID METHOD
Hans Iseli, Ligerz, Switzerland, assignor to Vereinigte Drahtwerke A.G., Biel, Berne, Switzerland
Filed Mar. 29, 1971, Ser. No. 128,894
Claims priority, application Switzerland, Apr. 8, 1970, 5,096/70
Int. Cl. B32b 31/18
U.S. Cl. 156—269
16 Claims

ABSTRACT OF THE DISCLOSURE

A method and apparatus for the fabrication of so-called nail plates, typically used in the construction industry, wherein a carrier web is placed upon a conveyor element moving in a substantially horizontal direction, the carrier web being displaced or moved through substantially regular incremental steps. Nail pins pointed at both ends are inserted into a first transverse strip of the carrier web during each period of standstill of the carrier web and a liquid plastic adhesive is also applied in the form of a strand to a second transverse strip of the carrier web spaced from such first transverse strip. Thereafter the carrier web thus equipped with the nail pins and the plastic adhesive is passed through a heating zone for the purpose of polymerizing the adhesive.

BACKGROUND OF THE INVENTION

The present invention is directed to a new and improved method for the fabrication of so-called nail plates and also is directed to a new and improved apparatus for the performance of the aforesaid method.

A nail plate is an aid which is used in the construction industry for interconnecting structural elements formed of wood, typically for instance at the joints. A typical construction of nail plate has been shown and described, for instance, in Swiss Pat. 456,898.

In order to fabricate these nail plates different techniques and apparatuses of conventional construction have already been tested. Thus, for instance there was contemplated a pressing operation in a mould, as such is conventional for plastic articles with cast metal parts. This technique, however, could not be used in practice because the large number of spikes or nail pins made it practically impossible to eject the plates from the mould. Additionally, it was not possible to sufficiently economically carry out the operations of filling of the mould with glass fiber mats, synthetic resin and the spikes or nail pins. It was not possible to realize a continuous manufacturing operation with this prior art method and in consideration of the hardware which is presently available in the art such continuous operation is also not conceivable.

A different manufacturing technique contemplated placement of the glass fiber mats and a hard aerated or foamed plastic plate upon a grate formed of rods, the hard aerated plastic plate intending to serve as a provisional support for the pins until application and setting or hardening of the plastic. Then the nail pins were inserted or pushed between the rods and thereafter the plastic mass was cast or poured thereon. With this technique it was contemplated to insert the nail pins by means of a rockable charging device or a jarring or vibrating table through the agency of separator means of known construction and through the intermediary of hose means into a perforated template in such a manner that upon opening the separator means a pin or spike simultaneously slide into each opening or perforation of the template. As soon as a nail pin was situated in a separator the separator devices were intended to prevent the subsequent delivery of further nail pins.

Thereafter, the nail pins were intended to be pushed with the aid of a punch block through the template into the aforementioned support. Also this prior art manufacturing technique could not produce any satisfactory results, because the relatively thin nail pins or spikes which were pointed at both ends oftentimes produced disturbances at the separators or when inserted through the template if there was present the slightest deviation of the mould or template pattern. During continuous application of the plastic or synthetic resin these primary disturbances produced secondary disturbances which usually manifested themselves in the form that too much plastic flowed into the hard aerated plastic plate and allowed such to soften and swell. Consequently, during hardening of the resin this caused distortion of the plate owing to the natural shrinkage. As a result of this distortion the pins or spikes were also canted, the finished product then being unusable. Additionally, attempts were made to convey the pins by means of compressed air. But this technique was also unsatisfactory because no surface was present which was suitable for building up the requisite pressure head.

Now the criteria for attaining a good nail plate are the following: the nail pins or spikes must be disposed perpendicular to the plane of the plate, there must be present a good attachment or adherence of the nail pins in the glass fiber-reinforced plastic, there must be present a uniform layer thickness and assembly of the laminate formed of the foam or aerated plastic and the synthetic resin, an increased resistance against ejection of the nail pins from the plate in that at each nail pin there is formed a uniform plastic collar at the region of the hard foamed plastic plate. These criteria can only then be realized if the manufacturing operations proceed uniformly and if techniques are resorted to which regulate penetration of the plastic into the hard foamed plastic plate.

SUMMARY OF THE INVENTION

Therefore, it will be recognised from what has been explained above that there is still present a real need in the art for a method and apparatus for the manufacture of such nail plates which is not associated with the aforementioned drawbacks present in the prior art manufacturing techniques and equipment used therein. Hence, a primary objective of the present invention is to fulfill the existing need in the art and to overcome these drawbacks.

Another and more specific object of the present invention relates to the provision of an improved method of, and apparatus for, economically, reliably and effectively manufacturing these nail plates without there being present the aforementioned disadvantages experienced in the state-of-the-art.

Now, in order to implement these and still further objects of the invention, which become more readily apparent as the description proceeds, the method aspects of this invention for the manufacture of nail plates, and which satisfies the above requirements and objectives, contemplates placing a carrier web or sheet upon a conveying element which can be advanced in at least approximately horizontal direction, the carrier sheet or web being forwardly moved or advanced at regular intervals or steps. Each time that the carrier sheet or web comes to standstill nail pins or spikes which are pointed at both ends are placed into a first transverse strip of the carrier web, and specifically, perpendicular to the upper surface thereof, and at the same time there is applied to a second transverse strip of the carrier web which is disposed at a spacing from the first transverse strip a liquid plastic adhesive in the form of a strand. The carrier sheet or web which is thus now provided with the nail pins or spikes and with the plastic adhesive is thereafter passed through a heating zone and heated-up for the purpose of polymerizing or setting the adhesive.

A preferred embodiment of the inventive method contemplates forming the carrier web or sheet on the conveying element in the form of a laminated or sandwich web at which there are piled or placed from the bottom towards the top a plastic foil, a hard foamed plastic layer of a few millimeters thickness, a metallic foil and a glass fiber mat.

Not only is the invention, as explained above concerned with a novel method for the fabrication of such nail plates or sheets, but further teaches new and improved type of apparatus structure for the performance of the aforesaid method. The equipment of the invention is basically manifested by the features that there is provided the combination of:

(a) A substantially elongate machine frame;

(b) A conveying mechanism at such machine frame, such conveying mechanism embodying an endless conveying element, means for guiding an upper run of the conveying element in substantially horizontal direction along the machine frame while entraining a carrier web or sheet placed thereon, (i) said conveying mechanism including a device for the cyclic or rhythmic advancing of the conveying element in regular and exactly calculated steps;

(c) A first unit or means arranged substantially transverse to the machine frame which, during each period of standstill of the conveying element inserts nail pins or spikes into a transverse strip of the carrier web in such a manner that these nail pins piercingly extend through and perpendicular to the surface of such transverse strip;

(d) A second unit or means which, each time that the conveying element comes to standstill, applies a liquid plastic adhesive in the form of a strand to a transverse strip of the carrier web or sheet; and (e) A device which is arranged after said first and second units and by means of which the carrier web during through-passage is heated up by hot air at both faces thereof.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 1A and 1B collectively illustrate a complete elevational view of a first form of inventive apparatus for carrying out the method aspects of this invention;

FIGS. 2A and 2B collectively provide a total top plan view of the apparatus depicted in FIGS. 1A and 1B;

FIG. 3 is a partial elevational view and a partial longitudinal sectional view of a conveying element operatively associated with the apparatus depicted in FIGS. 1A, 1B, 2A and 2B and located at one of the deflecting or turning wheels thereof;

FIG. 4 is a fragmentary cross-sectional view of the conveying element depicted in FIG. 3, taken substantially along the line IV—IV thereof;

FIG. 5 is a fragmentary plan view of the conveying element and an indexing feed device for such conveying element;

FIG. 6 is an elevational view, partially in longitudinal section, of the unit or mechanism serving for the insertion of a double-row of nail pins or spikes;

FIG. 7 is an end view of the arrangement of FIG. 6 as viewed in the direction of the arrow VII, the left-half of this illustration showing the movable components in a catch or receiving position for the nail pins, the right-half of the illustration showing the components in the position they assume when the nail pins or spikes have been inserted at the laminated web;

FIG. 8 is a partial top plan view of the arrangement of FIG. 6, partially depicted in cross-section;

FIGS. 9 and 10 are respective longitudinal sectional views of the insertion mechanism depicted in FIG. 6, wherein in FIG. 9 the movable components of such mechanism have been shown in the position they assume when the insertion of the pins has just been completed, while in FIG. 10 the same components have been shown in the position they assume when the catch plate is again raised over the insertion comb;

FIG. 11 is a side view of a portion of the unit serving for application of the synthetic resin or plastic adhesive;

FIG. 12 is a schematic front view of a second portion of this unit; and

FIG. 13 is a top plan view of an apparatus serving to control this unit.

Figure 1A:
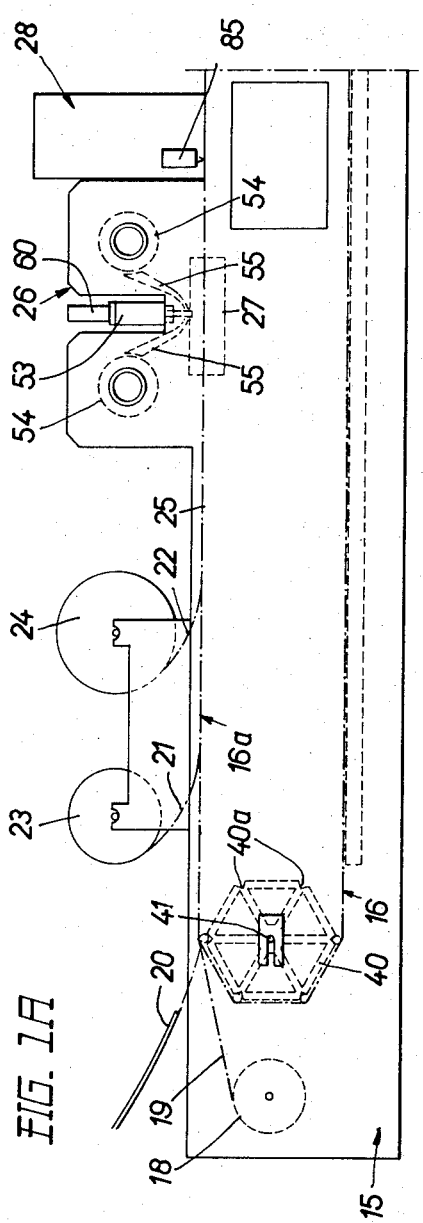
Figure 2A:
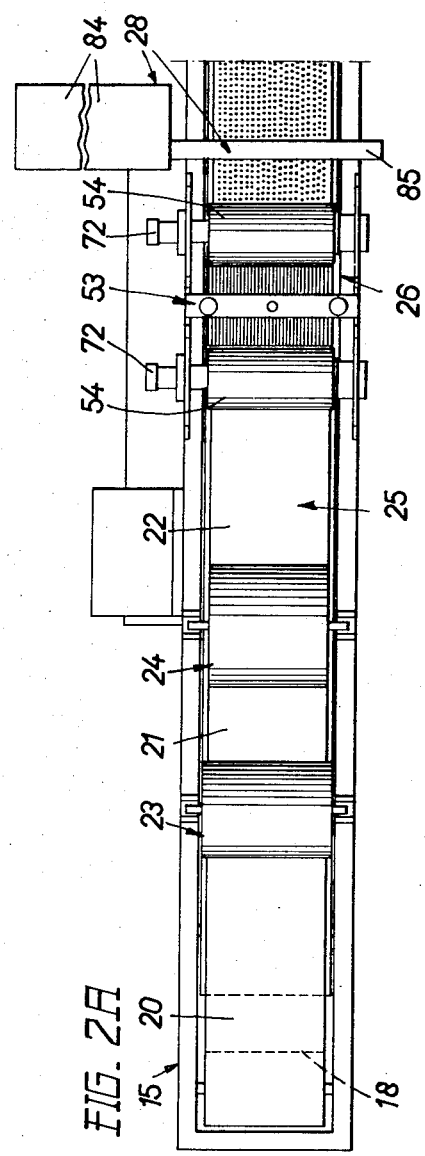

DETAILED DESCRIPTION OF THE PREFERRED EMBODIMENTS (a) General description of the overall apparatus structure The apparatus for the continuous fabrication of nail plates or sheets illustrated in the drawings will be seen to comprise an elongated or lengthwise extending machine frame 15, the contour of which has only been shown in FIGS. 1A, 1B, 2A and 2B. Within this machine frame 15 there extends an endless conveying element, generally designated by reference character 16, and which is part of a conveying device or mechanism which will be described more fully hereinafter in conjunction with FIGS. 3, 4 and 11. At a first zone or region of the apparatus there is formed upon the run 16a of this conveying element 16, and which conveyor run 16a moves at regular intervals or steps, a carrier sheet or web in the form of a laminated web, generally designated by reference character 17. This laminated carrier web 17, when viewed from the bottom towards the top, will be understood to be composed of a plastic foil, a hard foamed plastic layer possessing a thickness of a few millimeters, a metallic foil and a glass fiber mat. Now the plastic foil, designated by reference numeral 19, is delivered by a supply roll or spool 18 and travels to the front end of the conveying element 16. The hard foamed or aerated plastic layer is delivered, for instance, in the form of a series of individual shorter plates 20 or as a continuous web. The metallic foil 21 and the glass fiber mat 22 are played-off of associated supply rolls or spools 23 and 24 respectively.

At the zone 25 of the equipment the laminated web appears in its finished condition upon the run 16a of the conveyor or conveying element 16. Following this zone or region 25 there is arranged a first unit, designated in its entirety by reference character 26, and serving the purpose of placing nail pins or spikes N in a transverse strip or row of the laminated web 17.

At the region of this first unit 26 there is also located an indexing feed device 27, by means of which the conveyor element 16 together with the laminated web 17 is moved forwards in uniform or regular steps. A second unit 28 is arranged after the first unit 26, the second unit 28 serving to applying a liquid plastic adhesive in the form of a strand to a second transverse strip of the laminated web which is spaced from the first mentioned transverse strip or section. After the laminated web 17 passes beneath this second unit 28 it moves through a heating zone provided internally of a tunnel structure 29, and at which heating zone the previously applied plastic adhesive is polymerized or set, and thereafter web 17 passes through a cooling zone where the now finished nail plate web is gradually cooled down to the ambient temperature.

The nail plate web leaving the tunnel 19 has been indicated at 30. At that location where the conveyor element 16 is again deflected or turned the nail plate web 30 is raised from the conveying or conveyor element 16 through the action of a roller 31 and then arrives, for instance, at a table or the like where it can be cut-up into sections of desired length.

(b) Description of the conveyor apparatus

Considering now the construction of the conveyor apparatus as disclosed herein by way of example, by referring to FIGS. 3, 4, 5 and 11 it will be recognised that such essentially embodies the endless conveyor element 16 consisting of a series of elements which are hingedly connected or articulated to one another. Each articulated element or member consists of a perforated sheet metal plate 32 extending in the direction of the primary axis of the conveying element 16, lengthwise extending or longitudinal webs 33 and transverse webs 34, as well as the members 35 equipped with rack teeth 35a which are arranged at both longitudinal edges of such conveying element 16. The holes or bores 42 provided at the perforated sheet metal plates 32 are spaced from one another at a distance corresponding to the desired spacing of the nail pins or spikes of the nail plates which are to be fabricated. The diameter of these holes 42 is approximately twice as large as the diameter of the nail pins N.

Further, as best seen by referring to FIGS. 4 and 11 the hinged connection between successively arranged elements or members of the conveyor element 16 is provided by the axle pins 36. At each such pin member 36 there is arranged at one lengthwise extending side of the conveying element 16 a travelling roll 37 having flanges at each side, and at the other lengthwise extending side of such conveying element there is arranged upon such pin member a travelling roll 38 without flanges. At the region of the upper run 16a of the conveyor element 16 these rollers or rolls 37 and 38 travel upon rails 39 attached to the machine frame 15. The axle pins 36 will be also seen to possess a cylindrical head portion 36a at the innermost end thereof. These head portions 36a engage with recesses 40a of star wheels or planetary pinions 40, by means of which the conveyor element 16 is deflected at both ends of the apparatus. The star wheels 40 are, of course, arranged in pairs and are seated upon shafts 41 which rotate in bearings which are lengthwise adjustable at the machine frame 15.

As will be described more fully hereinafter at the unit 26 the nail pins N are inserted, during each standstill period of the conveying element 16, into the laminated web 17 in the form of a zig-zag-double row. To achieve this result the holes 42 of the perforated sheet metal plates 32 are arranged in a corresponding configuration, as best observed by referring to FIGS. 3 and 5. Additionally, as seen by specifically referring to FIG. 5 the spacing or division a between such a double hole row is exactly equal to the spacing b of the rack teeth 35a provided at the elements 35. A feed pawl 43 of a feed mechanism to be described more fully in conjunction with FIG. 5 engages in such teeth 35a, and specifically at the region which is located laterally adjacent a nail pin-injection or insertion apparatus of the unit 26.

This feed or advancing mechanism, also referred to as an indexing feed device and designated in FIG. 1A by reference numeral 27, will be seen to embody a locking pawl 44 actuated by an air cylinder 45 and likewise engages with the rack teeth 35a, whereas the feed pawl 43, actuated by an air cylinder 46, performs a feed or advancing step by the amount of one tooth spacing or division. The length of each of the perforated sheet metal plates 32, in other words the length of the individual elements or members of the conveyor element, is limited in such a way that impermissible summation errors during the fabrication of the perforated sheet metal plates 32 and the indexing member 35 cannot occur. The arrangement of the effective position of the feed or advancing pawl 43 at the same transverse line as the nail pin-insertion mechanism of the unit 26 likewise contributes to prevention of indexing errors.

The locking pawl 44 is lifted by the air cylinder 45 from the teeth 35a directly prior to the time that the pawl 43 advances the conveyor element 16 by an amount corresponding to one tooth spacing or division. The feed or advancing pawl 43 is guided parallel to the conveying direction within an elongate hole 48 of a plate 49, attached to the machine frame 15, by means of a bolt member 47. This bolt member 47 serves as the point of rotation or axis of rotation for the feed pawl 43. a roller 50 being mounted at the end thereof which faces away from its effective end. During the to-and-fro movement of the feed pawl 43 the roll 50 rolls in an approximately rectangular-shaped template opening 51 which is provided at the plate 49. The direction of attack of the compressed air cylinder 46 is chosen such that the roll 50, when the pawl 43 is retracted, rolls upon the template opening 51 at the side situated closer to the conveyor element 16 and finally bears against the rear transverse side serving as a stroke-limiting means for the retraction of the pawl. During forward displacement of the pawl 43 the roller 50 initially moves along the rear transverse side of the template opening 51 owing to the action of a tension spring 52. Consequently, the pawl 43 is automatically placed into meshing engagement with the teeth of the indexing rod or rack means 35. Since during the subsequent forward movement the roll 50 bears upon the outer side of the template opening 51 no excessive transverse forces act upon the conveying element. The advance or feeding of the pawl 43 is limited by the front transverse side or edge of the template opening 51 through the agency of the roller or roll 50.

The unit or means 26 serving for the insertion of the nail pins or spikes N into the laminated web 17, these spikes being pointed at both ends, has been illustrated in detail in FIGS. 6 to 10. Unit 26, in addition to the actual insertion mechanism 53 further incorporates two similar charging devices 54 which are arranged before and after the insertion device or mechanism 53, and also incorporates two chutes or slides 55.

The nail insertion mechanism 53 will be seen to possess a stationary housing 56 which, as shown in FIG. 7, is stationarily but adjustably mounted at the machine frame 15 by means of the members 57 and 58. Within the housing 56 there is movably guided for up and down movement an injection box 59 which is driven by the action of two compressed air cylinders 60 attached to the housing 56. Injection combs 61 are secured to the bottom of the injection box 59, the total number of prongs of such injection combs 61 corresponding to the number of nail pins of a single row and the spacing of the prongs corresponding to the required spacing of the nail pins at the nail plate to be fabricated, as viewed in the transverse direction.

The form or shape of the injection combs 61 is best apparent by referring to FIG. 8. A catch plate 62 is arranged to be movable up and down at the injection box 59, this catch plate 62 being driven by an air cylinder 63 secured to the injection box or cabinet 59, as best seen by referring to FIG. 7. Grooves 62a are formed at the lower portion of the catch or entrainment plate 62, these grooves engaging with an exact fit in the corresponding grooves of the injection combs 61. In the raised portions located between the grooves there is embedded a respective permanent magnetic rod member 64, the length of which at a minimum corresponds to that of the nail pins or spikes N which are to be seated, and the magnetic field of which is sufficient to erect the nail pins from their almost horizontal position, at which they arrive at the slides 55, and to retain such in the grooves 62a of the catch or entrainment plate 62. The lower portion of the catch plate 62 must be formed so as to be antimagnetic, in order that the nail pins will positively bear upon the bottom or base of such grooves. For the same reason the injection or insertion combs 61 must be formed of a non- or anti-magnetic material, so that when they are raised again they do not have the tendency of lifting out the nail pins which have been inserted into the laminated web. Also the slides 55, at least at their lower portion, must be formed of an anti-magnetic material.

Now in FIG. 6 and in the left-hand portion of FIG. 7 there have been depicted in their rest position the movable components of the injection mechanism or device 53. During placing of the nail pins initially the slides 55 pivot in a controlled sequence, and these slides likewise are formed, as mentioned above, of non-magnetic material. Thereafter, the compressed air cylinders 60 downwardly displace the insertion or injection box 59 together with the catch or entrainment plate 62 which then is non-movable with respect thereto, until this catch plate 62 is situated above the laminated web 17. In this position impact bolts 65, fixedly inserted in the catch plate 62, bear against the lower ends of elongate holes 66 provided at the housing 56.

Thereafter, the insertion or injection box 59, driven by the compressed air cylinder 63, moves by itself further downwards and thus strips the nail pins N from the catch plate 62 and pushes such stripped pins into the laminated web 17 situated therebelow. This position has been shown in FIG. 9. The lower terminal position of the said pin insertion box 59 is defined by the displacement path of the non-visible piston member reciprocably working within the cylinder 60 and corresponds to the desired penetration depth of the nail pins N. A conventional and therefore non-illustrated terminal switch or equivalent device, actuated in the lower terminal position, directly furnishes air to the compressed air cyclinder 63 for the purpose of retracting the catch or entrainment plate 62, as best seen by referring to FIG. 10.

It will be recalled that the permanent magnetic bars or rods 64 produce a magnetic field and this magnetic field is completely removed from the region of the nail pins or spikes as long as such are still supported by the insertion comb 61. A wiper switch, actuated for instance by the upwardly moved bolts 65, controls the air cylinders 60 through the agency of a four-way valve in such a manner that the pin insertion box 59 together with the catch plate 62 is raised. The impact bolts 65 bear against the upper portion of the elongate holes 66 of the housing 56 before the pin insertion box 59 has reached its uppermost terminal position. The catch plate 62 now remains stationary, whereas the pin insertion box 59 continues to be raised further upwards until the elongate holes 67 at the insertion box 59 bear against the bolt members 65. In this terminal or rest position, best shown in FIG. 6, a terminal switch delivers a control pulse for the purpose of rocking-in the slides or chutes 55 through the action of the associated air cylinders 68. The pin insertion mechanism is therefore again in its pin catching or receiving position as such has been shown in FIG. 6 and therefore, can again appropriately receive a series or double-row of nail pins or the like.

As best seen by referring to FIG. 8 the slides or chutes 55 are divided by webs 55a into a series of channels, each channel serving the purpose of conveying a nail pin from the charging devices 54 to the catch plate 62 for each work cycle. The sliding track of the slides or chutes 55 is formed in such a way that, on the one hand, the nail pins which are tangentially ejected by these charging devices 54 do not bounce-off such slides or chutes and, on the other hand, the pins or spikes which are caused to slide by virtue of the action of the chutes 55 do not tend to shoot past the catch plate 62 located in its rest position. The positions of the chutes 55 actuated by the compressed air cylinders 68 are controlled by suitable terminal switches of known construction.

The pin charging devices 54 actually constitute subject matter of my commonly assigned, co-pending U.S. patent application, Ser. No. 127,991, filed Mar. 25, 1971 and entitled "Apparatus for Separating and Individually Dispensing Small Elongate Parts," and to which reference may be readily had. Therefore, only sufficient details of such charging devices will be considered herein as are thought to be necessary for fully understanding the overall operation of the inventive equipment.

Now the primary component of each such charging device 54 is a drum member 69 which internally is provided with a number of peripheral grooves 70 located adjacent to one another. A supply of spikes or nail pins in the form of a random pile of these objects are introduced into the interior of the drum 69 through the intermediary of a pipe or conduit 71. As best recognised by referring to FIGS. 1A and 8 in this drum member 69 is driven by a suitable drive motor, here shown in the form of an oil motor unit 72 and its velocity is regulated by a flow control valve mechanism 73, the flow throughpassage of which is controlled by an associated cam disc 74 (FIG. 6). By means of the transmission 75, for instance a chain drive arrangement, the angular velocity of the cam disc 74 is directly proportional to that of the drum 69 and, more precisely, corresponds to one-half of that of the drum 69. In the position of the equipment depicted in FIG. 6 the drum 69 has just experienced a brief deceleration or delay. A longitudinal channel 76, through which a respective nail pin can be tangentially propelled, however is still closed by a closure cap or flap member 77. Those pins or spikes which have been correctly received in the receiving recesses 76a neighboring the longitudinal channel 76 and neighboring peripheral grooves 70, slide into the channel 76 because of the brief deceleration of the drum 69, whereas other nail pins which have been additionally entrained fall back into the interior of the drum and into the supply of pins appearing therein in the form of a pile or heap, owing to the shock-like retardation or deceleration of the drum as explained above. In the next moment the drum 69 is slightly accelerated, in order thereafter, when the channel 76 is located at the region of the chute 55 associated with such drum, to be decelerated practically to null. Shortly before, the flap 77, fixedly connected with a feeler arm 79 equipped with a feeler roll 78 at its free end, is pressed upwardly against the action of a spring 80 (FIG. 6), because a cam 82 provided at a support arm 81 is pressed outwardly due to the action of an associated compressed air cylinder 83. The nail pins which appear at the channel 76 are therefore thrown-out and slide via the chutes 55 to the nail pin-catch plate 62.

Now, by virtue of the action of the compressed air cylinder 83 the associated carrier or support arm 82 together with the cam 82 is retracted back into the starting position, furthermore the chutes 55 are pivoted away from the catch plate 62 owing to the action of the associated compressed air cylinders 68 and the placement operation for the pins can now take place by means of the insertion device or mechanism 53. During these functions and the pin placement or setting operation the drum 69 of both charging devices 54 slowly rotate further and then accelerate (owing to the corresponding control of the associated oil drive motor unit 72 due to the action of the control cam 74) to a velocity corresponding to about one-half of the maximum velocity. During this reduced velocity the channel 76 and the recesses 76a of each drum travel beneath the supply stack of nail pins located within such drum, the recesses 76a thus again being able to receive nail pins.

Now before the thus entrained nail pins reach approximately the height of the drum axes owing to a further one-quarter revolution of the corresponding drum, these drums 69 are accelerated to such a degree that the nail pins located within the corresponding recesses 76a, owing to the thus produced centrifugal action, can also not fall back into the drum interior when such pins have reached the zenith or top of the associated drum. However, the centrifugal force which is produced must not be so large that the entire supply of pins will be likewise entrained by the frictional forces prevailing between the inner wall of the drum and the nail pins. During this first revolution of the drum 69 it is desirable not to initiate drum deceleration or delay when the channel 76 is located at the top or zenith; also deceleration to practically null is also dispensed with when the channel 76 is located at the region of the chutes 55. Upon the start of the second revolution of the drum the drum is only decelerated to a reduced velocity, so that nail pins can fall into those recesses 76a which remained empty during the first revolution of the drum. The flaps 77 remain closed during the initial drum revolution. During the second rotation or revolution of the drum, just as was the case during the first revolution thereof, there is accelerated to a maximum velocity before the longitudinal channels 76, during upward travel have reached the height of the drum axis. When the channel 76 is situated or located approximately at the zenith, then there is again briefly brought about drum deceleration or delay, so that there is terminated a cycle of two drum revolutions. The cycles are carried out in predetermined constant time intervals, the duration of which is independent from the duration of the work cycles of the remaining apparatus components. However, the flaps 77 are only opened when the slides 55 are rocked-in, that is, when the movable portions of the pin insertion devices 53 are located in their upper rest position of FIG. 6.

The unit 28 serving the purpose of applying liquidous plastic adhesive in the form of a strand to a transverse strip or section of the laminated web could, in principle, be connected ahead of the unit 26 serving to insert the nail pins. It is preferable to use as the plastic adhesive an average reactive polyester, possibly a mixture of two components with different viscosity. Suitable as the polyester adhesive is, for instance, the adhesive product sold under the trademark "Polylite" by the well known Swiss concern, Reichhold Chemie AG, located at Hausen bein Brugg, Switzerland.

The adhesive dispensing mechanism or unit 28 has been shown in detail in FIGS. 11 and 12 and its associated control mechanism has been depicted in FIG. 13. This unit 28 will be seen to embody a housing 84 secured to the machine frame 15. Belonging to this housing 84 is an overhang arm or beam 85 which extends over the conveying element 16 and the laminated web 17 in a direction transverse to the direction of travel of the conveying element. The overhang beam 85 is provided at its lower region with a guide rail 86, which in cross-section possesses an approximately C-shaped configuration and extends substantially parallel to the upper surface of the conveying element 16. A carriage or slide 87 is movably guided along the guide rail 86, carriage 87 having attached thereto a supply or delivery nozzle 88 for the purpose of dispensing a plastic adhesive in the form of a strand.

Movement of this carriage or slide 87 occurs through the agency of an endless transmission member 89, for instance a steel cable which is trained about a deflecting disc 90 and a drive gear or wheel 91. As best shown by referring to FIG. 12 the drive wheel 91 is rigidly connected for rotation with a sprocket pinion 92 over which travels a suitable chain, for instance a Gall chain 93. Chain 93 also travels over a deflecting wheel 94 and is attached at one end to one end of the piston rod 95 of a non-visible piston of a double-acting air cylinder 96. This cylinder 96 is attached in any suitable and therefore non-illustrated manner to the frame or housing 84, just as is also the housing 97 of a metering or dosing pump unit, generally referenced in its entirety by reference character 98 in FIG. 12. The other end of this chain 93 is operatively connected with one end of the movable portion of the metering pump 98 which has collectively been referenced by 99. A Gall chain 100 is connected with the other end of this movable pump portion 99 and with the other end of the piston rod 95, chain 100 passing over two further deflecting gears or wheels 94.

Now in the metering pump housing 97 there are located two independent compartments or chambers 101. Each compartment 101 is equipped with a respective suction valve unit 102, a pressure valve unit 103, and operating within each such compartment 101 is a respective piston or plunger 104 constituting a component of the movable pump portion 99. Both plungers 104 are connected via yokes 105 and traction rods 106 in such a manner with one another that during movement of the thus formed frame always one of the plungers 104 moves into the associated compartment 101 while the other plunger moves out of its associated compartment. By virtue of this arrangement during each movement of the dosing or metering pump portion 99 and the carriage 87 together with the dispensing nozzle 88 in a given directional sense synthetic resin or plastic adhesive is sucked-up and simultaneously pressed-out. The conveyed or dispensed quantity of adhesive material is proportional to the displacement path, that is to say, it is in a certain relationship to a unit of displacement through which the dispensing nozzle 88 moves. The inlets of the suction valves 102 are collectively connected to a suction line 107 and through the agency of this line to a supply of liquid plastic adhesive, whereas the pressure valves 103 are collectively connected to a flexible pressure line or conduit 108 which couples these valves 103 with the inlet of the dispensing nozzle 88.

The control of the double-acting air cylinder 96 occurs through the agency of the pneumatic valve unit 109 which is designed and constructed in such a manner that when it is not impinged with pneumatic medium, that is to say in its rest condition, the air cylinder 96 is supplied in such a manner that the piston and the piston rod 95 assume the illustrated position of FIG. 12.

As best seen by referring to FIG. 13 the pneumatic valve unit 109 is connected by a conduit 110 with a pneumatic terminal switch 111. The depicted position of the piston rod 95 corresponds to that position where the pneumatic valve unit 109 is not impinged, by means of this pneumatic terminal switch 111, with control air. When the pneumatic valve unit 109 is impinged with control air by the terminal switch 111 the piston rod 95 moves into the other terminal position until the control air escapes through the terminal switch 111. This terminal switch 111 is actuated by means of a cam disc 112 which is fixedly connected with a lantern or pin gear 113 driven by the rack teeth 35a of the elements 35 attached to the conveyor element-members. The cam disc 112 possesses half the number of cams as the pin gear 113 has driving pins 113a. As a result, the terminal switch 111 is only actuated during each second step through which the conveying element 16 moves.

The relationship of the effective diameter of the sprocket gear 92 and the drive gear 91, forming part of the drive connection between the movable portion 99 of the dosing or metering pump 98 with the carriage 97 carrying the dispensing nozzle 88, is equal to the relationship of the paths through which move the plungers 104 and the carriage 87 together with the dispensing nozzle 88.

The quantity of dispensed plastic adhesive for each unit of displacement of the components 87 and 88 can be determined by suitable selection of the diameter of the plunger 104. Thus, the plastic adhesive is applied in the form of a uniform strand to a transverse extending strip of the laminated web 17. This plastic adhesive ultimately distributes itself in the transverse direction of such strip, in other words in the lengthwise direction of the laminated web 17. In so doing, it soaks or imbues the glass fiber mat 22 forming the upper layer of the laminated web. A small quantity of plastic adhesive also penetrates along the outer surface of the nail pins N and through the holes of the metallic foil 21, these holes being formed during insertion of the pins or spikes into the laminated web. Consequently, the adhesive material thus arrives up to the region of the hard foamed plastic plate or layer 20 and forms at the region of the metallic foil 21 a collar which, after the plastic adhesive has polymerized or set, considerably contributes to the positive securement of the nail pins at the nail plate. However, owing to the presence of the metallic foil 21 penetration of the plastic adhesive into the hard foamed plastic layer is retarded, firstly because this layer should not be imbued with plastic adhesive (because otherwise during setting of the adhesive this layer may distort), and secondly, also in order to reduce to a minimum the consumption of plastic adhesive material.

(c) Description of the construction and operation of the heating zone

Polymerization of the plastic adhesive takes place in the first section of the tunnel 29 through which travels the laminated web 17 after its passage beneath the adhesive dispensing or applying unit 28. As best seen by referring to FIG. 1B at approximately one-half of the length of this tunnel 29 and at the lower region thereof there is arranged a blower or ventilator 114. Ventilator 114 sucks air through the discharge end of the tunnel and through the corresponding adjoining half of the tunnel along the conveying element 16 and the nail plate web, as generally indicated by the arrows 115. This air is delivered to a chamber or compartment 116 located beneath a partition or separation wall 117 at the first section of the tunnel 29. Partition wall 117 extends in spaced relationship from and beneath the run 16a of the conveyor element 16.

Now in this compartment or chamber 116 there are housed suitable electrical heating elements 118, the air passing such heating elements 118, as indicated by the arrows 119, being heated thereby. The heated air is then upwardly deflected by the action of air deflectors 120 arranged at the region of the tunnel inlet, so that this heated air first moves along the lower and upper face of the conveyor run 16a and the nail plate web, as indicated by the arrows 121, and then flows back again to the blower or ventilator 114. Owing to the action of this heated air the plastic adhesive material sets or polymerizes, and it should be recognized that at this section of the tunnel there is present a uni-directional flow of the heated air and the nail plate web. At the second tunnel section the nail plate web is moving in a direction opposite to the flow of cool air, moving in the manner indicated by the arrows 115, and the nail plate web is thus cooled down to approximately the surrounding or ambient temperature.

(d) Summary of operation of apparatus

The mode of operation of the individual components of the described inventive apparatus as recapitulated, can be considered to encompass the hereinafter described individual functions if one begins with the position of the equipment as depicted in FIG. 6 and which is as follows:

The spikes or nail pins N are ejected from the drums 69 of the unit 26 and received by the catch plate 62, during which time the indexing feed device 27 simultaneously advances the conveying or conveyor element 16 by one indexing step. Immediately thereafter the nozzle 88 of the unit 28 applies a strand of plastic or synthetic resin adhesive to the laminated web 17. Similarly, directly after completion of the indexing step the chutes or slides 55 are rocked-out, the carrier arm means 81 together with their cam means 82 are rocked into the ineffectual position of such cam means 82 and owing to the action of the insertion device 53 a double-row of nail pins is placed into the laminated web 17. Thereafter, the movable components of the injection device 53 are again returned back into their upper rest position, the chutes 55 are again rocked in the direction of the catch plate 62 and the carrier arms 81 together with the cams 82 are again pivoted back into their effective position.

During such time as this operational cycle is carried out the pin supply drums 69 carry out their own operational cycle independently of the cycle of the pin insertion device 53 such that during undisturbed operation the pin insertion device 53 is prepared to receive a further series of nail pins before completion of the drum cycle. In the event the insertion device is not in a preparatory position for receiving a further series of nail pins, then a new drum cycle begins automatically without, however, expelling the pins. On the other hand, an insertion operation for the pins into the web cannot take place if no nail pins are ejected by the drums. These operational sequences are ensured by terminal switch means which indicate to a pre-control system the terminal positions of the chutes 55, the completed activity of the indexing feed device 27, the terminal position of the pin insertion box 59 depicted in FIG. 6 and the completion of the coming work cycle, this pre-control system functioning as a storage means for the completed operations and as a blocking means for the operations which are not yet to take place. In the illustrated exemplary embodiment there have only been used pneumatic components, and specifically as the terminal switch means valve units having different flow paths and mechanically actuated, at the pre-control system valve means having different flow paths and pneumatically actuated, and as the power switch means likewise pneumatically actuated valves with different flow paths.

In the fabricated nail plate the metallic foil 21, although it is fixedly connected with the remaining components, functionally is not a component of such nail plate. As far as its functional aspects are concerned it is much more a component of the method because it regulates the penetration of the synthetic resin or plastic along the embedded nail pins—as long as such plastic had not yet gelled—into the hard foamed plastic layer, and thus prevents both a softening and swelling of the hard foam material as well as a shortage of plastic at the glass fiber mats. In functional aspect the hard foamed plastic and the plastic foil are likewise components of the method aspects of this invention (although both have already been discussed in the previously mentioned Swiss patent for the nail plate structure), because they are required as provisional supports for the nail pins until setting of the plastic since they reduce to an acceptable degree the shrinkage of the hard foamed plastic plate in the plane of such plate, in addition to reducing the shrinkage experienced by the plastic during polymerization. The plastic foil prevents the plastic from running out of the laminated web along the inserted nail pins.

Furthermore, it would be equally conceivable and possible to provide for the conveyor element 16, instead of the metallic foil and the hard foamed plastic web, a pre-perforated metallic band of at least 0.2 millimeter thickness as carrier web or to add such as a component of the conveyor element.

While there is shown and described present preferred embodiments of the invention, it is to be distinctly understood that the invention is not limited thereto but may be otherwise variously embodied and practiced within the scope of the following claims. Accordingly, what is claimed is:

1. A method for the fabrication of nail plates, comprising the steps of:
   (a) providing a conveyor element moving in at least approximately horizontal direction;
   (b) placing a carrier web upon said conveyor element and moving said carrier web through substantially regular incremental steps;
   (c) inserting nail pins pointed at both ends into a first transverse strip of said carrier web during each period of standstill of said carrier web;

13

(d) applying a liquid plastic adhesive in the form of a strand to a second transverse strip of said carrier web which is spaced from said first transverse strip; and (e) thereafter passing the carrier web thus equipped with the nail pins and the plastic adhesive through a heating zone for the purpose of polymerizing the adhesive.

2. The method as defined in claim 1, including the step of applying the adhesive at substantially the same time that the nail pins are inserted into the carrier web.

3. The method as defined in claim 1, including the step of placing the nail pins into the carrier web in a position substantially perpendicular to the face of the carrier web.

4. The method as defined in claim 1, including the step of forming the carrier web at the conveyor element in the form of a laminated web successively incorporating, as viewed from the bottom towards the top thereof, a plastic foil, a hard foamed plastic layer of a few millimeters thickness, a metallic foil, and a glass fiber mat.

5. The method as defined in claim 1, including the step of placing the nail pins at the first transverse strip of said carrier web in a substantially zig-zag configured row.

6. The method as defined in claim 1, further including the step of using a metering pump supplied-dispensing nozzle for application of the liquid plastic adhesive to the second transverse strip of said carrier web, moving said adhesive dispensing nozzle transversely across the carrier web and controlling dispensing of the liquid plastic adhesive therefrom as a function of the displacement of the adhesive dispensing nozzle.

7. The method as defined in claim 1, further including the step of using as the heating zone a tunnel structure through which flows hot air for heating the carrier web equipped with the nail pins and adhesive and thereby forming a nail plate web, controlling the movement of the hot air through a first section of the tunnel structure in a direction which is the same as the direction of movement of the nail plate web and the conveyor element, and prior to heating the air at a lower portion of the tunnel structure using the unheated air to cool the nail plate web by causing such unheated air to flow through a second section of the tunnel in countercurrent flow with respect to the direction of movement of the nail plate web.

8. An apparatus for the fabrication of nail plates, comprising:

(a) a substantially elongate machine frame;

(b) a conveying mechanism located at such machine frame, said conveying mechanism embodying an endless conveyor element;

(c) means for guiding an upper run of the conveyor element in substantially horizontal direction along the machine frame while entraining a carrier web placed thereon;

(d) means for the cyclic feed advance of said conveyor element in substantially regular and exactly calculated steps;

(e) a first unit arranged substantially transverse to the machine frame which, during each period of standstill of said conveyor element, inserts nail pins into a transverse strip of the carrier web in such a manner that these nail pins piercingly extend through said transverse strip substantially perpendicular to the surface of said carrier web;

(f) a second unit for applying liquid plastic adhesive in the form of a strand to a transverse strip of said carrier web whenever said conveyor element comes to standstill; and (g) a device arranged after said first and second units and by means of which said carrier web during its throughpassage is heated up by hot air at both faces thereof.

9. The apparatus as defined in claim 8, further including stationary means cooperating with said conveyor element for forming the carrier web as a continuous laminated web upon a first section of said conveyor element during movement thereof and in such a manner that this laminated web, viewed from the bottom towards the top thereof, is provided with successive layers of a plastic foil, a hard foamed plastic layer, a metallic foil and a glass mat.

10. The apparatus as defined in claim 8, wherein said conveyor element is composed of a number of hingedly interconnected members, each said member comprising a perforated plate having a support surface for the carrier web and reinforced at the side opposite said support surface by web means, and further including at the region of said opposite side at the hinge connection locations of said members with one another support head means extending substantially coaxially with respect to the hinge axis and also including roller means, deflecting wheel means located at deflection locations of said conveyor element, said deflecting wheels having recess means for receiving said support head means, guide rail means secured to said machine frame upon which travel said roller means at an upper run of said conveyor element.

11. The apparatus as defined in claim 7, wherein said first unit for inserting said nail pins is provided with pin supply means effective during the feed advancement of said conveyor element by one step, said pin supply means forming from a random pile of nail pins at least one row of nail pins extending substantially parallel to one another, chute means including guide channel means for receiving said row of nail pins, said first unit further including a pin insertion mechanism incorporating a stationary housing, an up-and-down movable pin insertion element equipped with pin insertion comb means formed of anti-magnetic material located at the underside of said up-and-down movable pin insertion element, a first drive motor means for displacing said up-and-down movable pin insertion element, and up-and-down movable catch plate, second drive motor means for displacing said catch plate relative to said pin insertion element, said catch plate having an end portion protruding downwardly out of said pin insertion comb means during a rest condition of said pin insertion means, said protruding end portion of said catch plate being formed of anti-magnetic material and being provided with vertically extending pin catch and guide groove means for the nail pins, permanent magnetic rod means embedded at said protruding end portion, said catch and guide groove means receiving therein the nail pins coming in free flight from said chute means and then through magnetic attraction retaining such received nail pins therein, and control means for said first and second drive motor means, said control means, as soon as said conveyor element has completed a feed cycle, initially causing said catch plate together with said pin insertion element to arrive at the region of the carrier web, then said pin insertion element moves further downwards in order that said pin insertion comb means can insert the nail pins which are still guided in the catch and guide groove means of said catch plate into said carrier web until the thus inserted nail pins project out of the bottom face of said carrier web by a certain amount, then initially the catch plate alone and thereafter also said pin insertion element are retracted back into an upper rest position.

12. The apparatus as defined in claim 11, further including means for mounting said chute means to be pivotable about a transverse axis, third drive motor means for moving the lower portion of said chute means away from said catch plate directly prior to the beginning of the downward movement of said pin insertion element.

13. The apparatus as defined in claim 12, further including an arm member mounted to be pivotable at its lower end region about a transverse axis, the upper end region of said arm member being provided with cam means, fourth drive motor means for pivoting said arm member such that during return of said catch plate and said pin insertion element into their upper rest position and during such time as said pin supply means is prepared to deliver said nail pins therefrom said cam means is brought into its effectual position in which feeler means provided at a rotatable element of said pin supply means travel upon said cam means and cause the row of nail pins to be delivered to said chute means.

14. The apparatus as defined in claim 13, wherein said catch plate has longitudinal sides provided with offset catch and guide groove means; and wherein said first unit is provided with two each of said pin supply means for delivering a row of nail pins, said chute means and said arm member and the associated third drive motor means and fourth drive motor means as well as at said pin insertion element said pin insertion comb means are provided in double, so that during each operational cycle of said first unit nail pins are inserted in a zig-zag shaped double-row in said carrier web.

15. The apparatus as defined in claim 8, wherein said second unit for application of a plastic adhesive strand comprises frame means incorporating an overhang beam equipped with rail means and extending over an upper run of said conveyor element in a direction substantially transverse thereto, said second unit further including a carriage means with an adhesive dispensing nozzle secured to said carriage means for dispensing liquid plastic adhesive in the form of a strand, said carriage means being guided at said rail means, a double-acting dosing pump means arranged at said frame means, said double-acting dosing pump means incorporating a movable pump component equipped with displacement pump piston means, double-acting motor drive means for said double-acting dosing pump means, a drive connection for interconnecting said movable portion of said dosing pump means both with said carriage means as well as with said double-acting motor drive means, said double-acting dosing pump means having an outlet, a tubular connection for coupling said outlet with an inlet of said adhesive dispensing nozzle, and control means actuated by said conveyor element which in conjunction with said double-acting motor drive means, after one step of the conveyor element, causes said movable pump component and said carriage means to be moved in one direction and after a subsequent step of said conveyor element said movable pump component and said carriage means are moved in the opposite direction, in each instance through a complete stroke.

16. The apparatus as defined in claim 8, wherein said device serving to heat said laminated web comprises a tunnel structure, said conveyor element passing through said tunnel structure, said tunnel structure having a lower portion, ventilator means arranged at said lower portion of said tunnel structure approximately at the central region thereof for drawing surrounding air into said tunnel structure at an end thereof where said conveyor element departs from said tunnel structure, said drawn-in air being delivered as an air current into a section of said tunnel structure spaced at a distance beneath said conveyor element by a partition wall member, electrical heating element means distributively arranged along the length of said section for heating said air current, a deflector member provided at said section at the region of the inlet end of said conveyor element into said tunnel structure for deflecting the heated air current into a space situated above said conveyor element and into a space between said conveyor element and said partition wall means.

References Cited

UNITED STATES PATENTS

| | | | |
|---|---|---|---|
| 3,616,083 | 10/1971 | Mohr | 156—513 |
| 3,401,072 | 9/1968 | Pearson | 156—578 |
| 3,349,899 | 10/1967 | Powers | 206—56 DF |
| 3,315,436 | 4/1967 | Baum et al. | 156—522 |
| 3,212,632 | 10/1965 | Baum et al. | 206—56 DF |
| 3,165,868 | 1/1965 | MacDonald et al. | 206—56 DF |
| 2,590,358 | 3/1952 | Williams | 206—56 DF |

FOREIGN PATENTS 456,898   5/1968   Switzerland.

DANIEL J. FRITSCH, Primary Examiner

U.S. Cl. X.R.

156—280, 293, 298, 303.1, 305, 381, 423, 499, 516, 552, 562, 569, 578; 206—56 DF